Jan. 13, 1959  R. LUCIEN ET AL  2,868,338
ANTI-SKID MECHANISM FOR MASTER CYLINDER OPERATED BRAKE
Filed March 5, 1956
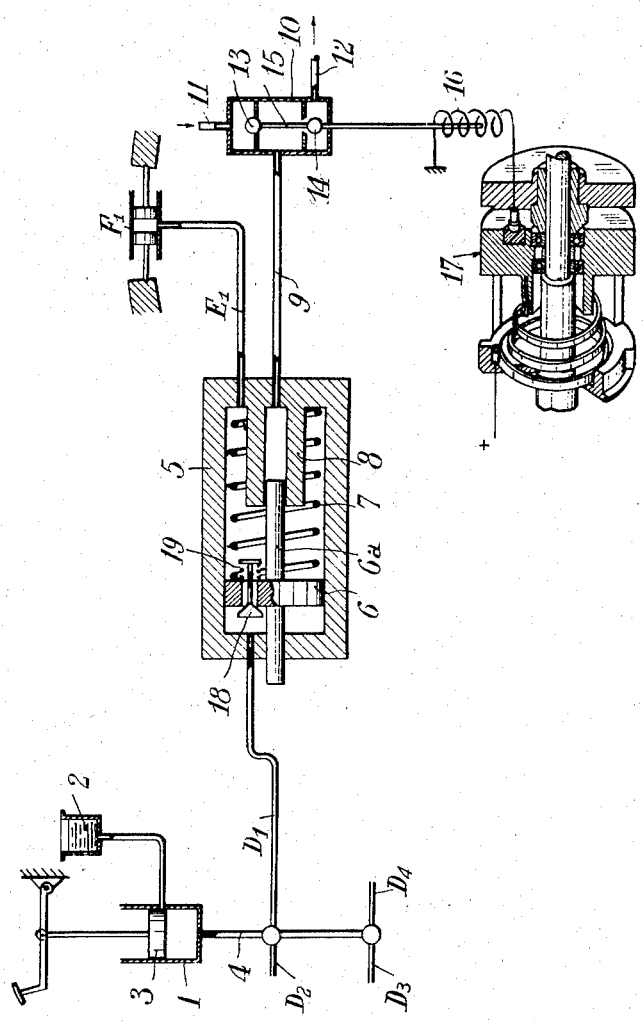

2,868,338
ANTI-SKID MECHANISM FOR MASTER CYLINDER OPERATED BRAKE

René Lucien, Neuilly-sur-Seine, and Jean-Pierre Marie Legros, Paris, France, assignors to Societe d'Inventions Aeronautiques et Mecaniques S. I. A. M., Fribourg, Switzerland, a corporation of Switzerland Application March 5, 1956, Serial No. 569,499

3 Claims. (Cl. 188—181)

This invention relates to braking control systems.

The invention has as an object the provision of a control for the braking of vehicles, which control renders ineffective the braking effort applied to a wheel as soon as the deceleration resulting from the braking of this wheel exceeds a given value, but which, on the other hand, restores the effectiveness of the braking effort after the deceleration has itself also ceased.

The invention relates more particularly to automobile vehicles in which the braking effort is transmitted to the wheel brakes from a master cylinder, by means of a fluid under pressure.

In accordance with the invention, there is utilized, for the wheels of a vehicle, a deceleration detector, known per se, which operates by inertia and is generally known as an "accelerometer"; this detector is provided with means for emitting an electric signal when the deceleration reaches a critical, pre-determined value.

The device is characterised in that, in a conduit which connects the master cylinder to a wheel cylinder, there is inserted a hydraulic apparatus cooperative with an electro-valve, or an equivalent device, which is capable, under the impulsion of an electric current produced by a deceleration of the wheel, to apply in the said apparatus a force which acts in the opposite sense to the effort initiated by the driver, and which thus diminishes the braking pressure in the cylinder in question.

In accordance with the invention, the said hydraulic apparatus is constituted by a cylinder in which a piston is able to move, thus defining in the said cylinder two chambers, one of which communicates with the master cylinder and the other with the wheel cylinder, this second chamber being itself provided with an internal auxiliary cylinder which receives an extension of the piston and in which, by the action of the electro-valve, the pressure of a fluid is admitted when the deceleration of the wheel considered attains a pre-determined value.

One embodiment of the invention, given by way of example and not in any restrictive sense, is shown diagrammatically in the single figure of the attached drawing. In this example, 1 is the master cylinder communicating with a reservoir 2 of a hydraulic fluid; 3 is a piston adapted to move inside the cylinder under the action of the brake pedal. A main conduit 4 conducts the fluid to the brakes of the four wheels through the branches $D_1$, $D_2$, $D_3$, $D_4$.

As the device is identical for all four wheels, it will suffice to describe it with respect to one wheel only. In the conduit $D_1$ which terminates with the brake $F_1$, is interposed a cylinder 5 in which moves a piston 6. Normally, a pressure applied on the brake pedal forces the fluid into the conduits $D_1$ to $D_4$, which forces back the piston 6, compressing the spring 7, and actuates the brake $F_1$. A release of the pressure on the pedal is followed by the expansion of the spring 7 which pushes back the piston 6, and the braking action ceases.

The cylinder 5 comprises an internal cylinder 8, in which is received an extension 6a of the piston 6. A conduit 9 leads into the base and the cylinder 8 and connects it to a valve 10, receiving fluid at high pressure through a conduit 11 and having a return conduit 12 to the reservoir (not shown). The valve 10 is divided into three compartments in which the conduits 9, 11 and 12 terminate. The separating partitions form the seatings of two ball valves 13, 14 which are coupled together by a rod 15. An electro-magnet 16, acting on the rod 15, enables the conduit 9 to be put in communication alternatively with the pressure conduit 11 and with the return conduit 12 to the reservoir. This electro-magnet is actuated by a deceleration detector 17, which has the effect of closing the electric circuit of the electro-magnet 16 when the angular deceleration of the wheel, due to braking, reaches a pre-determined value (greater than that which results from the normal slowing-down of the vehicle). The excitation of the electro-magnet opens the valve 13 and closes the valve 14, which puts the conduit 9 under high pressure. The result of this is that the piston 6 is pushed back, assisted by the spring 7; the fluid is compressed in the conduit $D_1$ and in consequence the pedal piston 3 moves back, thus reacting against the pressure applied by the driver. The latter is thus warned that the control device has operated. At the same time, the brake is rendered inactive and the pressure ceases in the branch $E_1$.

Provision is made for fitting the piston 6 with a valve 18 which is urged towards its seating by a spring 19. This valve carries out a double function. In the case of excess pressure due to overheating, it enables fluid to pass through the piston 6 from the right-hand face towards the left-hand face. On the other hand, if the volume of cylinder swept-out by the complete travel of the piston 6 were not sufficient to ensure braking—which would occur if the air had not been completely purged from the system, or of a leakage of fluid in the brake—the stem of the valve 18 comes into abutment against the internal cylinder 8. In this way, a direct passage is opened for the braking fluid delivered from the master cylinder 1 to the brake under the action of the pedal 3.

What we claim is:

1. A device for controlling the braking of a wheel by means of a fluid under pressure comprising: a master cylinder; control means for controlling said master cylinder; a wheel cylinder; a conduit coupling said master cylinder to said wheel cylinder; a further cylinder inserted in said conduit; a piston in said further cylinder and defining therein first and second chambers, the first chamber communicating with said master cylinder, the second chamber with said wheel cylinder; an internal auxiliary cylinder provided in the second chamber; an auxiliary piston rigidly fixed to said piston and moving in said auxiliary cylinder; a valve; an auxiliary conduit coupling said auxiliary cylinder to said valve, a fluid pressure conduit and an exhaust conduit coupled to said valve; an acceleration-responsive device responsive to the wheel for controlling said valve to couple said auxiliary conduit with said fluid pressure conduit when the deceleration of the wheel reaches a pre-determined value to oppose said control means.

2. A device as claimed in claim 1 comprising, on said piston, a further valve for coupling said chambers when an excessive pressure occurs in the second chamber.

3. A device as claimed in claim 1 comprising, on said piston, a further valve coupling said chambers when an excessive pressure occurs in the second chamber; a stem rigidly fixed to said further valve; and a fixed abutment to contact said stem at the end of travel of the piston.

References Cited in the file of this patent

UNITED STATES PATENTS

| | | |
|---|---|---|
| 2,527,290 | Anderson | Oct. 24, 1950 |
| 2,726,738 | Fawick | Dec. 13, 1955 |
| 2,759,571 | Carlson et al. | Aug. 21, 1956 |

FOREIGN PATENTS

| | | |
|---|---|---|
| 1,111,144 | France | Oct. 26, 1955 |